(12) United States Patent
Park

(10) Patent No.: US 10,515,162 B2
(45) Date of Patent: Dec. 24, 2019

(54) METHOD FOR OPTIMAL DESIGN OF AQUIFER INJECTION-PUMPING SYSTEM

(71) Applicant: DONG-A UNIVERSITY RESEARCH FOUNDATION FOR INDUSTRY-ACADEMY COOPERATION, Busan (KR)

(72) Inventor: Namsik Park, Busan (KR)

(73) Assignee: DONG-A UNIVERSITY RESEARCH FOUNDATION FOR INDUSTRY-ACADEMY COOPERATION, Busan (KR)

( * ) Notice: Subject to any disclaimer, the term of this patent is extended or adjusted under 35 U.S.C. 154(b) by 58 days.

(21) Appl. No.: 15/517,823

(22) PCT Filed: Apr. 27, 2016

(86) PCT No.: PCT/KR2016/004403
§ 371 (c)(1),
(2) Date: Apr. 7, 2017

(87) PCT Pub. No.: WO2016/190556
PCT Pub. Date: Dec. 1, 2016

(65) Prior Publication Data
US 2018/0068038 A1    Mar. 8, 2018

(30) Foreign Application Priority Data
May 22, 2015   (KR) .................. 10-2015-0071411

(51) Int. Cl.
*G06F 7/00*     (2006.01)
*G06F 17/50*    (2006.01)
(Continued)

(52) U.S. Cl.
CPC ......... *G06F 17/5009* (2013.01); *G06Q 50/26* (2013.01); *B09C 1/002* (2013.01)

(58) Field of Classification Search
CPC ............ G06F 16/20; G06F 17/20; G06F 7/48; G06Q 10/04
See application file for complete search history.

(56) References Cited

U.S. PATENT DOCUMENTS

| 5,224,541 A | * | 7/1993 | Jennings, Jr. | ....... E21B 41/0057 166/270 |
| 7,739,089 B2 | * | 6/2010 | Gurpinar | ................. E21B 43/00 703/10 |

(Continued)

FOREIGN PATENT DOCUMENTS

| JP | 2011208363 A | 10/2011 |
| KR | 1020000001356 A | 1/2000 |

OTHER PUBLICATIONS

Park, Nam Sik et al., Design of Optimal Wet-Season Injection Well for Augmenting Groundwater Resources in Coastal Areas, 2009, pp. 415-424, vol. 42, No. 5, Journal of Korea Water Resources Association.

(Continued)

*Primary Examiner* — Daniel A Kuddus
(74) *Attorney, Agent, or Firm* — Cantor Colburn LLP

(57) ABSTRACT

The invention relates to a design method for an underground reservoir injection-pumping system. According to one embodiment, provided is a design method for an underground reservoir injection-pumping system, comprising a first optimization step of optimizing a first determination variable related to injection wells and pumping wells on the basis of hydrogeological data of an underground reservoir, and a second optimization step of optimizing a second determination variable related to a pump and water pipe network to be installed in the underground reservoir, on the basis of variable values of the first determination variable derived in the first optimization step, wherein the first determination variable includes the numbers and the posi- (Continued)

tion data of injection wells and pumping wells to be installed in the underground reservoir, and the second determination variable includes data related to a pipe diameter distribution of water pipes and a pump specification for each well.

16 Claims, 7 Drawing Sheets

(51) Int. Cl.
  *G06Q 50/26* (2012.01)
  *B09C 1/00* (2006.01)

(56) References Cited

U.S. PATENT DOCUMENTS

| | | | | |
|---|---|---|---|---|
| 7,953,585 B2* | 5/2011 | Gurpinar | ............... | E21B 43/00 |
| | | | | 703/10 |
| 8,352,227 B2* | 1/2013 | Klumpen | ............... | E21B 49/00 |
| | | | | 703/10 |
| 8,670,966 B2* | 3/2014 | Rashid | ............... | G06Q 10/04 |
| | | | | 166/245 |
| 8,684,085 B2* | 4/2014 | Kameyama | ......... | E21B 41/0064 |
| | | | | 166/228 |
| 8,775,141 B2* | 7/2014 | Raphael | ............... | E21B 43/00 |
| | | | | 703/10 |
| 2005/0149307 A1* | 7/2005 | Gurpinar | ............... | E21B 43/00 |
| | | | | 703/10 |
| 2007/0156377 A1* | 7/2007 | Gurpinar | ............... | E21B 43/00 |
| | | | | 703/10 |
| 2008/0133194 A1* | 6/2008 | Klumpen | ............... | E21B 49/00 |
| | | | | 703/10 |
| 2008/0140369 A1* | 6/2008 | Rashid | ............... | E21B 43/00 |
| | | | | 703/10 |
| 2010/0042458 A1* | 2/2010 | Rashid | ............... | E21B 43/122 |
| | | | | 703/10 |
| 2014/0372088 A1* | 12/2014 | Suk | ............... | G06F 17/13 |
| | | | | 703/2 |

OTHER PUBLICATIONS

Jung, Eun Tae, Study on Sharp Interface Modeling of Freshwater through Confined Aquifer injection and Water Pumping, Master's Thesis, 2014, pp. 18-33, Dong-A University.

Jung, U Chang et al., Large Ground Water Reservoir Total Solution Technology, 2013, pp. 19-26, vol. 46, No. 9, Magazine of Korea Water Resources Association.

International Search Report for PCT/KR2016/004403 dated Aug. 24, 2016.

Written Opinion for PCT/KR2016/004403 dated Aug. 24, 2016.

* cited by examiner

FIG. 3

◆ INPUT DATA OF FIRST OPTIMIZATION ◆

| DATA TYPE | EXAMPLE OF DATA |
|---|---|
| HYDROGEOLOGY VARIABLE | GEOLOGICAL STRUCTURE OF AQUIFER, HYDRAULIC CONDUCTIVITY, STORAGE COEFFICIENT, POROSITY, BOUNDARY CONDITION AND INITIAL CONDITION, CHARACTERISTICS OF UNDERGROUND WATER QUALITY, ETC. |
| NUMERICAL ANALYSIS CONTROL VARIABLE | SPACE-TIME DISCRETE DATA, NONLINEAR REPETITIVE-SCHEME CONTROL DATA, AVAILABLE DAILY INJECTION QUANTITY, TARGET DAILY PRODUCTION AMOUNT, ETC. |
| OPTIMIZATION CONTROL VARIABLE | REPETITION NUMBER, CONVERGENCE DETERMINATION CONDITION, ETC. |
| DETERMINATION VARIABLE | NUMBER AND LOCATIONS OF INJECTION WELL AND PUMPING WELL, INJECTION AND PUMPING AMOUNT FOR EACH WELL, AND INJECTION AND PUMPING START TIME POINT |

FIG. 5

◆ OUTPUT DATA OF FIRST OPTIMIZATION ◆

| DATA TYPE | NOTE |
|---|---|
| DECISION VARIABLE OF OPTIMAL TEST COMBINATION | DECISION VARIABLES IN TEST COMBINATION WITH MAXIMUM AQUIFER PERFORMANCE VALUE |
| UNDERGROUND WATER FLOW CHARACTERISTICS OF OPTIMAL TEST COMBINATION | VALUE CALCULATED BY APPLYING OPTIMAL TEST COMBINATION TO UNDERGROUND WATER FLOW MODEL |
| OTHERS | TEST COMBINATIONS ATTEMPTED DURING OPTIMIZATION AND AQUIFER PERFORMANCE CHARACTERISTICS FOR EACH TEST COMBINATION |

FIG. 6

◆ INPUT DATA OF SECOND OPTIMIZATION ◆

| DATA TYPE | EXAMPLE OF DATA |
|---|---|
| FIRST DECISION VARIABLES OF OPTIMAL TEST COMBINATION CALCULATED IN FIRST OPTIMIZATION | NUMBER AND LOCATIONS OF INJECTION WELLS AND PUMPING WELLS, INJECTION AND PUMPING AMOUNT FOR EACH WELL, AND PREDICTED UNDERGROUND WATER LEVEL DURING INJECTION AND PUMPING |
| NUMERICAL ANALYSIS CONTROL VARIABLE | CONNECTIVITY OF WATER SERVICE PIPES FOR CONNECTING WELLS, DRIVING TIME PERIOD OF PUMP-WATER SERVICE PIPELINE NETWORK, ETC. |
| OPTIMIZATION CONTROL VARIABLE | REPETITION NUMBER OF TIMES, CONVERGENCE DETERMINATION CONDITION, ETC. |
| SECOND DECISION VARIABLE | DIAMETER DISTRIBUTION OF WATER SERVICE PIPE AND PUMP SPECIFICATIONS OF EACH WELL |
| RELATED DATA OF SECOND DECISION VARIABLE | MATERIAL OF WATER SERVICE PIPE, MATERIAL COST AND INSTALLMENT COST FOR EACH DIAMETER, PUMP FLOW RATE-PUMPING HEAD CHARACTERISTIC CURVE, PRICE FOR EACH PUMP, ELECTRIC CHARGES, ETC. |

FIG. 8

✦ OUTPUT DATA OF SECOND OPTIMIZATION ✦

| DATA TYPE | NOTE |
|---|---|
| DECISION VARIABLE OF OPTIMAL TEST COMBINATION | DECISION VARIABLE OF TEST COMBINATION WITH MINIMUM TOTAL COSTS (DIAMETER DISTRIBUTION OF WATER SERVICE PIPE AND PUMP SPECIFICATIONS OF EACH WELL) |
| DECISION VARIABLE RELATED DATA | UPFRONT COST AND MANAGEMENT COST ACCORDING TO OPTIMAL TEST COMBINATION |
| PUMP-PIPELINE NETWORK FLOW CHARACTERISTICS OF OPTIMAL TEST COMBINATION | VALUE CALCULATED BY APPLYING OPTIMAL TEST COMBINATION TO PUMP-WATER SERVICE PIPELINE FLOW MODEL (FLOW SPEED AND ENERGY LOSS FOR EACH PIPE DIAMETER, PUMP PUMPING HEAD, ETC.) |
| OTHERS | TEST COMBINATIONS ATTEMPTED IN OPTIMIZATION PROCEDURE, TOTAL COSTS FOR EACH OF TEST COMBINATIONS, ETC. |

METHOD FOR OPTIMAL DESIGN OF AQUIFER INJECTION-PUMPING SYSTEM

BACKGROUND

(1) Technical Field

The present invention relates to a method for optimal design of an aquifer injection-pumping system, and more particularly, to a method for optimal design of an aquifer injection-pumping system, for obtaining an optimal combination of variables such as the number and locations of an injection well and a pumping well, the specifications of a pump, and a diameter of a water service pipe in order to maximize the performance of an aquifer.

(2) Background Art

Salty underground water, in which seawater and fresh water are mixed, is underground water in a bedrock aquifer below land and is underground water. In this regard, research has been conducted into the development of alternative water resources for using a fresh water aquifer created by injecting fresh water into the basement saturated with salty underground water in advance.

FIG. 1 is a schematic diagram of an aquifer 10 and an injection well and pumping well constructed therein. The aquifer 10 is also referred to as an 'water bearing layer' and refers to a ground layer saturated with water and having enough permeability and mathematical continuity to discharge a significant amount of water among layers of a ground layer 20 or a portion of the ground layer. In general, the aquifer 10 may be formed on an impermeable layer 21. The aquifer 10 may be divided into an unconfined aquifer, an upper boundary of which has no impermeable layer, a confined aquifer, an upper boundary of which is surrounded by an impermeable layer, and so on.

An example of a method of desalinating the aquifer 10 includes a method of desalinating the aquifer 10 by continuously injecting fresh water through an injection well 30 and discharging salty underground water through a pumping well 40 and, to this end, a plurality of injection wells and pumping wells need to be constructed.

Conventionally, with regard to construction of an injection well and a pumping well, a design plan is determined by obtaining some arrangements of the injection well and the pumping well and then obtaining an optimal plan of the arrangements through underground flow modeling according to expertise in relation to a given location of an aquifer. However, since the number of constituent elements of an aquifer is high and the specifications of a separate element have a wide selection range, the number of available combinations of the constituent elements is infinite and, accordingly, it is not economically and technologically appropriate to determine a design plan of some arbitrarily determined arrangements, which is disadvantageous.

DETAILED DESCRIPTION

Technical Object

An exemplary embodiment of the present invention provides a method for optimal design of an aquifer injection-pumping system, for obtaining an optimal combination of components (the number and locations of injection wells and pumping wells, injection/pumping amounts for each well, an injection and pumping start time point, a pipe diameter of a connection pipeline network, specifications of a pump, and so on) with most economical and excellent performance among combinations of components included in the aquifer.

Technical Solving Method

According to an exemplary embodiment, there is provided a method for optimal design of an aquifer injection-pumping system using a computer, the method including first optimization of optimizing first decision variables of an injection well and a pumping well based on hydrogeology of an aquifer, and second optimization of optimizing second decision variables of a pump and a pipeline network, which are to be installed in the aquifer, based on variable values of the first decision variables obtained in the first optimization, wherein the first decision variables include data of the number and locations of injection wells and pumping wells to be installed in the aquifer, and the second decision variables include data of distribution of a pipe diameter of a water service pipe and pump specification of each well.

The first optimization may include selecting a plurality of test combinations of the first decision variables, calculating underground water flow characteristics of each test combination using an underground water flow model, calculating performance of the aquifer of each test combination based on the calculated underground water flow characteristics, and selecting a test combination with a maximum value of the performance of the aquifer as an optimal test combination among the plurality of test combinations.

The second optimization may include selecting a plurality of test combinations of the second decision variables, calculating flow characteristics of a water service pipeline network of each test combination using a pump-water service pipeline network flow network flow model, calculating total costs of each test combination based on the calculated flow characteristics of the water service pipeline network, and selecting a test combination with minimum total costs as an optimal test combination among the test combinations.

According to an exemplary embodiment, there is provided a computer readable recording medium having recorded thereon a program for executing the method.

Advantageous Effects

According to one or more embodiments of the present invention, an optimal combination of components (the number and locations of injection wells and pumping wells, injection/pumping amounts for each well, an injection and pumping start time point, a pipe diameter of a connection pipeline network, specifications of a pump, and so on) with most economical and excellent performance may be selected among combinations of components included in the aquifer to provide an optimal design plane of an injection-pumping system.

BRIEF DESCRIPTION OF DRAWINGS

FIG. 3 is a diagram illustrating an example of input data used for first optimization according to an exemplary embodiment of the present invention.

FIG. 5 is a diagram for explanation of exemplary output data of first optimization according to an exemplary embodiment of the present invention.

FIG. 6 is a diagram for explanation of exemplary output data of second optimization according to an exemplary embodiment of the present invention.

FIG. 8 is a diagram for explanation of exemplary output data of second optimization according to an exemplary embodiment of the present invention.

BEST MODE FOR EMBODYING THE INVENTION

Exemplary embodiments will now be described more fully with reference to the accompanying drawings to clarify aspects, other aspects, features and advantages of the present invention. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

It will also be understood that when an element is referred to as being "on" another element, it can be directly on the other layer or substrate, or intervening layers may also be present.

Terms such as "first" and "second" are used herein merely to describe a variety of constituent elements, but the constituent elements are not limited by the terms. The terms are used only for the purpose of distinguishing one constituent element from another constituent element. The exemplary embodiments described herein include complementary embodiments thereof.

Terms used herein are for the purpose of describing particular exemplary embodiments only and are not intended to be limiting. As used herein, the singular forms are intended to include the plural forms as well, unless context clearly indicates otherwise. It will be further understood that the terms "comprises" and/or "comprising," when used in the specifications, do not preclude the presence or addition of one or more other components.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the present invention.

Figure 1:
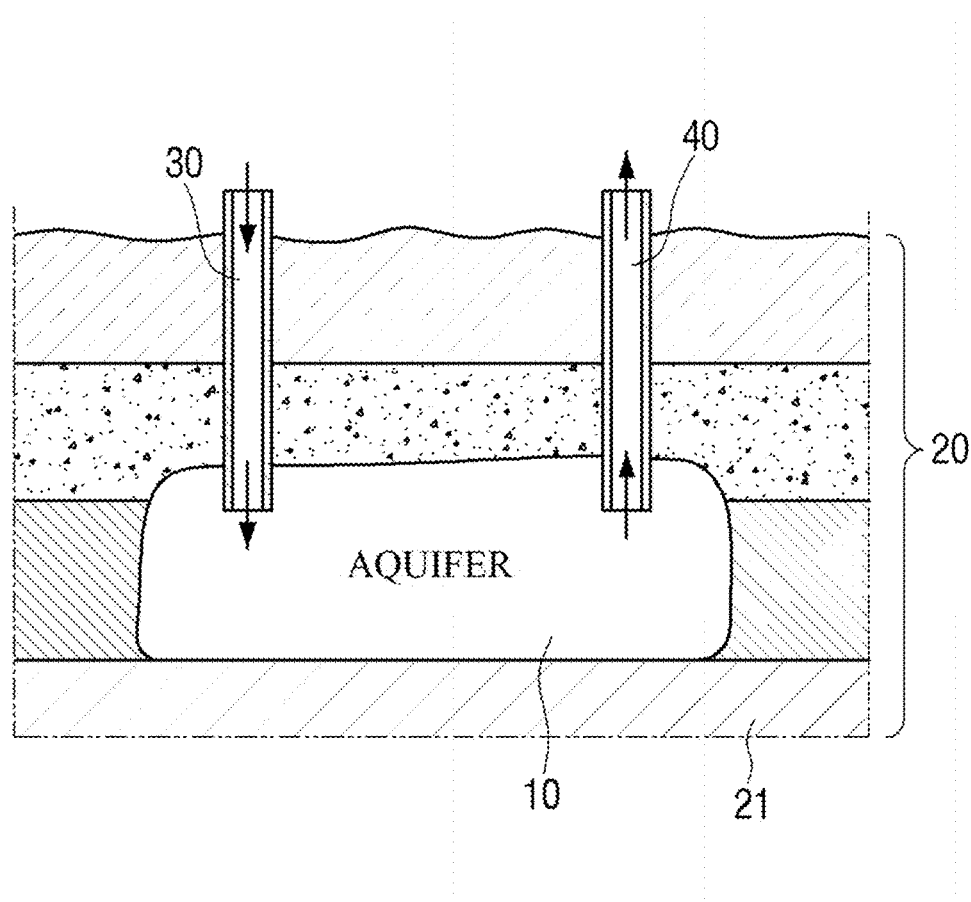
FIG. 1 is a schematic diagram of an aquifer and an injection well and pumping well constructed therein.
Figure 2:
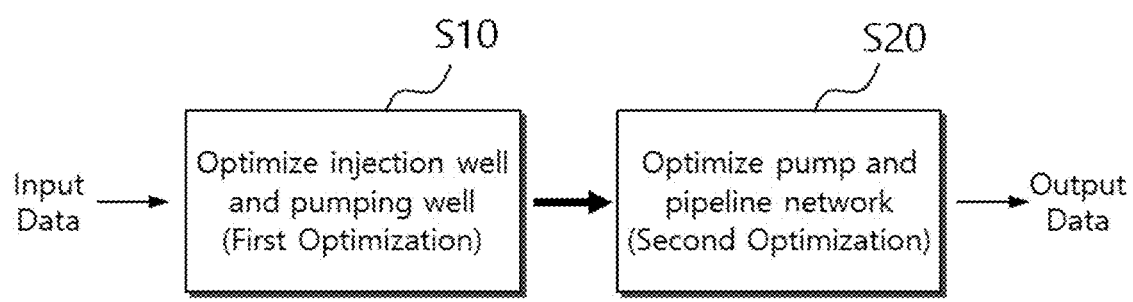
FIG. 2 is an exemplary flowchart of a method for optimal design of an aquifer injection-pumping system according to an exemplary embodiment of the present invention.

FIG. 2 is an exemplary flowchart of a method for optimal design of an aquifer injection-pumping system according to an exemplary embodiment of the present invention. Referring to the drawing, the method for optimal design of the aquifer injection-pumping system according to an exemplary embodiment of the present invention may include first optimization S10 of optimizing an injection well and a pumping well and second optimization S20 of optimizing a pump and a pipeline network.

According to an exemplary embodiment of the present invention, the first optimization S10 may be an operation of optimizing first decision variables of an injection well and a pumping well based on hydrogeology of an aquifer. This operation may be performed in order to select an optimal combination of the first decision variables for maximizing performance (which is a performance value quantified based on, for example, water storage, water quality of a pumping well, a supply time period of fresh water, and so on) of the aquifer.

Here, the first decision variables refer to variables for optimizing the aquifer, that is, variables corresponding to the maximum performance of the aquifer in the first optimization S10. According to an exemplary embodiment of the present invention, the variables of the injection well and the pumping well are set to the first decision variables. According to an exemplary embodiment of the present invention, the first decision variables may include the number and locations of the injection well and the pumping well and, according to an alternative embodiment, the first decision variables may further include an injection and pumping amount for each well and an injection and pumping start time point as well as the number and locations of the injection well and the pumping well.

According to an exemplary embodiment of the present invention, the second optimization S20 refers to second optimization of optimizing second decision variables of a pump and a pipeline network, which are to be installed in the aquifer, based on variable values of the first decision variables (e.g., the number and locations of the injection well and the pumping well) that is obtained in the above first optimization S10.

The injection well and the pumping well that constitute the aquifer may be connected by a pipeline network including a plurality of pumps and water service pipes. The second optimization S20 is performed in order to select an optimal combination of the second decision variables for minimizing upfront cost and management cost which are required to construct a pipeline network and a pump of the aquifer.

Here, the second decision variables refer to variables for optimizing the aquifer, that is, variables corresponding to minimum management cost of the aquifer in the second optimization S20. According to an exemplary embodiment of the present invention, variables for a pump and a pipeline network may be set as the second decision variables. According to an exemplary embodiment of the present invention, the second decision variables may include variables for distribution of a diameter (pipe diameters) of a water service pipe and pump specifications of each well.

As such, according to the illustrated embodiment, in the first optimization S10, an optimal combination of the first decision variables for the injection well and the pumping well may be determined and, in the second optimization S20, an optimal combination of the second decision variables for the pump and the pipeline network may be determined and, accordingly, a design plan of an injection-pumping system with most economical and excellent performance for a given aquifer may be selected.

Hereinafter, the first optimization S10 will be described with reference to FIGS. 3 to 5.

FIG. 3 is a diagram illustrating an example of input data used for the first optimization S10. FIG. 4 is a flowchart of an exemplary procedure of the first optimization S10 according to an exemplary embodiment of the present invention. FIG. 5 is a diagram illustrating an example of output data calculated in the first optimization S10.

Referring to FIG. 3, in order to perform the first optimization S10 according to an exemplary embodiment of the present invention, a hydrogeology variable, a numerical analysis control variable, an optimization control variable, and a decision variable may be input as input data to a first optimization algorithm.

The "hydrogeology variable" may be data of a given aquifer and may include, for example, a geological structure of an aquifer, hydraulic conductivity, a storage coefficient, porosity, a boundary condition and an initial condition, characteristics of underground water quality, and so on.

The "numerical analysis control variable" may be data to be used in a numerical model (refer to operation S130 of FIG. 4) of flow of underground water and may include data about conditions required to execute the numerical model. The numerical analysis control variable may include, for example, space-time discrete data, nonlinear repetitive-scheme control data, an available daily injection quantity, and a target daily production amount.

The "optimization control variable" may be a variable used to control an entire process of the first optimization S10 and may include, for example, a repetition number of an operation of calculating underground water flow characteristic and calculating the performance of the aquifer (refer to operations S130 and S140 of FIG. 4), a convergence determination condition in a determination operation (S150), or the like.

The "determination variable" may refer to a variable for optimizing an aquifer, that is, a variable corresponding to the maximum performance of the aquifer in the first optimization S10 and may include the number and locations of the injection well and the pumping well, an injection and pumping amount for each well, and an injection and pumping start time point, in the illustrated embodiment.

In this case, the hydrogeology variable, the numerical analysis control variable, and the optimization control variable may be variables that are preset as specific values prior to the first optimization S10 and each variable of the determination variable may be selected in a predetermined numerical range to generate a plurality of test combinations. An optimal test combination may be selected among a plurality of test combinations via the first optimization S10.

Figure 4:
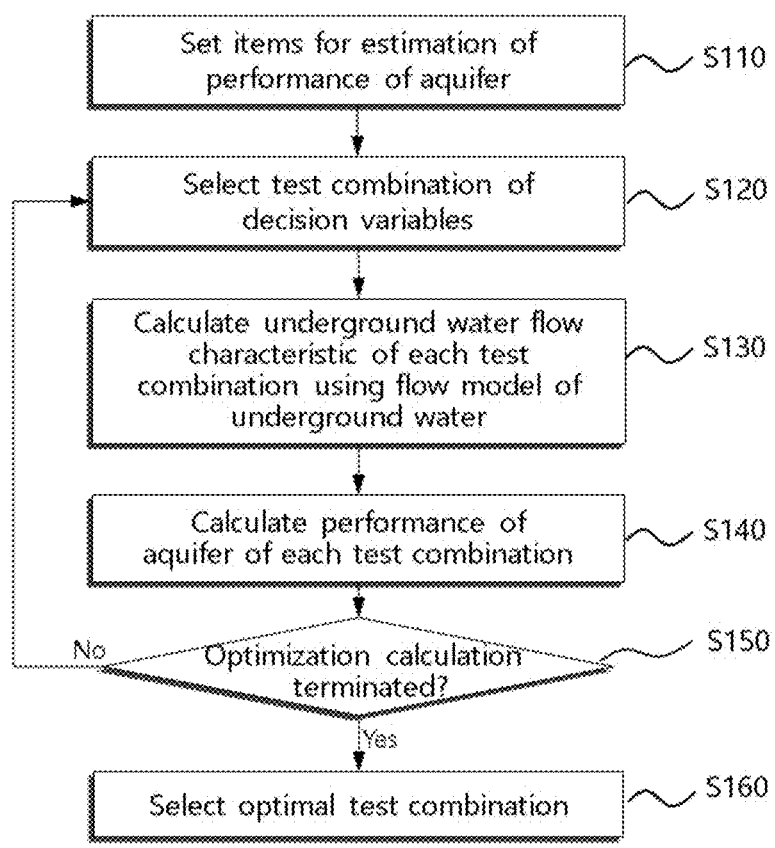
FIG. 4 is a flowchart of an exemplary procedure of first optimization (optimization of injection well-pumping well) according to an exemplary embodiment of the present invention.

Referring to FIG. 4, first, in operation S110, items for estimation of performance of the aquifer may be set. In the illustrated exemplary embodiment, performance of the aquifer may be a value quantified based on at least one of water storage, water quality of a pumping well, and a supply time period of fresh water and may be calculated as a performance value of the aquifer. However, needless to say, in an alternative embodiment, the performance of the aquifer may be calculated based on another characteristic value of the aquifer characteristics.

Then, in operation S120, a plurality of test combinations of the first decision variables may be selected. For example, assuming the number and locations of the injection well and the pumping well as the first decision variables, respective variable values of four variables, i.e., the number of injection wells, the locations of the injection wells, the number of pumping wells, and the locations of the pumping wells may be combined to generate each of test combinations.

In this case, in order to prevent an excessive increase in the number of test combinations, a range (i.e., a maximum value and a minimum value of each variable) of a value of each of variables included in the first decision variables may be preset and a plurality of test combinations may be generated in the numerical range.

A method of combining variables included in the first decision variables and selecting a test combination may not be particularly limited. In an exemplary embodiment of the present invention, the variables included in the first decision variables may be randomly selected in a predetermined range to generate a test combination.

As another example, when operations S130 and S140 are also performed on a predetermined number of test combinations to obtain a plurality of aquifer performance values of each test combination, a new test combination may be generated based on each of the obtained performance value. For example, when the number of injection wells is gradually increased, if the aquifer performance value becomes better, the number of injection wells may be further increased to create a test combination in a test combination to be newly generated.

Then, in operation S130, underground water flow characteristic of each test combination may be calculated using a numerical model of flow of underground water. In order to simulate flow of underground water when fresh water is injected into an aquifer through an injection well and salty underground water is discharged through a pumping well, a large amount of research has been conducted into numerical models and methods of simulating an underground water flow model may broadly include a dispersion model and a boundary surface model.

The dispersion model is a method of simulating movement and concentration dispersion of fresh water and salty underground water according to initial pressure and density to model flow of underground water. The boundary surface model is a method of calculating flow of fresh water and salty underground water assuming a boundary surface between fresh water and salty underground water. In the present invention, the underground water flow model to be used in operation S130 may not be limited to a specific model and an arbitrary underground water flow model may be used.

In an exemplary embodiment, the hydrogeology variable and the numerical analysis control variable that are described with reference to FIG. 3 may be input as an initial setting value to the underground water flow model and, in operation S130, a plurality of test combinations of the first decision variables may be sequentially input to calculate the underground water flow characteristics of each test combination.

In this case, the underground water flow characteristics calculated in operation S130 may be changed in some embodiments and, for example, may include variables to be used to perform a next operation S140 of calculating aquifer performance. For example, in the illustrated embodiment, since it is assumed that an aquifer performance value is calculated as a value obtained by quantifying aquifer performance based on at least one of water storage, water quality of a pumping well, and a supply time period of fresh water, the underground water flow characteristics may include, for example, a value such as the volume and area of the aquifer, a detection rate of fresh water, and an underground water level of each well.

Then, the aquifer performance of each test combination may be calculated based on the underground water flow characteristics calculated in operation S130 (operation S140). The aquifer performance may be variably defined according to various variables for describing the characteristics of the aquifer and, as described above, in the illustrated embodiment of the present invention, it may be assumed that aquifer performance is calculated as a value quantified based on at least one of water storage, water quality of a pumping well, and a supply time period of fresh water.

Operation S130 of calculating underground water flow characteristics of each test combination and operation S140 of calculating aquifer performance may be repeatedly performed on the plurality of test combinations selected in operation S120 and the number of test combinations on which operations S130 and S140 are to be repeatedly performed may be adjusted in operation S150. According to an exemplary embodiment of the present invention, repetition of operation S150 may be stopped when a current repetition number exceeds a preset repetition number or a performance value of each test combination calculated in operation S140 is not increased any longer.

As such, when operation S150 is also performed to calculate aquifer performance values for respective test combinations of the plurality of test combinations, a test combination with a maximum aquifer performance value among the plurality of test combinations may be selected as an optimal test combination and may be output as output data of the first optimization S10 in operation S160.

FIG. 5 is a diagram for explanation of exemplary output data of the first optimization S10 according to an exemplary embodiment of the present invention. According to an exemplary embodiment of the present invention, the output data may include a determination variable of an optimal test combination and underground water flow characteristics of the optimal test combination.

The "determination variable of optimal test combination" may be a determination variable of a test combination when an aquifer performance value is maximum. The determination variable of the optimal test combination may refer to decision variables in a test combination with a maximum aquifer performance value according to the calculation result of operation S140, that is, data about the number and locations of an injection well and a pumping well, an injection and pumping amount for each well, and an injection and pumping start time point.

The "underground water flow characteristics of optimal test combination" may refer to underground water flow characteristics calculated by applying the underground water flow model to the optimal test combination in operation S130.

As illustrated in FIG. 5, according to an alternative embodiment of the present invention, test combinations (i.e., the remaining test combinations except for optimal test combination) attempted in an optimization procedure, aquifer performance characteristics for each of these test combinations, and so on may be additionally output as the output data of the first optimization S10.

Hereinafter, the second optimization S20 will be described with reference to FIGS. 6 to 8.

Injection wells and pumping wells that constitute an aquifer may be connected to a pipeline network including a plurality of water service pipes and may require a plurality of pumps for injection and pumping. Cost for installing a connection pipeline network is reduced as a pipe diameter is reduced. However, as a pipe diameter is reduced, energy loss is increased due to high flow speed and, thus, cost for purchasing a pump and cost for energy for aquifer management may be increased.

Accordingly, the second optimization S20 is performed in order to obtain an optimal combination of the second decision variables (e.g., diameters of water service pipes and specifications of a pump) for minimizing total costs of upfront cost required to construct a pipeline network and a pump of the aquifer and management cost required during management of the aquifer.

Referring to FIG. 6, for the second optimization S20, the first decision variables of the optimal test combination calculated in first optimization, the numerical analysis control variable, the optimization control variable, the second decision variables, and related data of the second decision variables may be input as input data of an algorithm for the second optimization S20.

The "first decision variables of the optimal test combination calculated in first optimization" may be the same as some data of "determination variable of optimal test combination" and "underground water flow characteristics of optimal test combination" of output data of the first optimization described with reference to FIG. 5 and may include, for example, the number and locations of injection wells and pumping wells, an injection and pumping amount for each well, and a predicted underground water level during injection and pumping.

The "numerical analysis control variable" may be data to be used in a numerical model (refer to operation S220 of FIG. 7) of a pump-water service pipeline network and may be data about conditions required to execute a numerical model. The numerical analysis control variable may include, for example, connectivity of water service pipes for connecting wells, a driving time period of a pump-water service pipeline network, and so on.

The "optimization control variable" may be a variable used to control all processes of the second optimization S20 and may include, for example, a repetition number of times of calculating flow characteristics of underground water in a water service pipeline network and calculating total costs for each test combination (refer to operations S220 and S230 of FIG. 7), a convergence determination condition, and so on in a determination operation S240.

The "second decision variables" may refer to a variable for optimizing an aquifer in the second optimization S20, that is, a variable with minimum total costs of the aquifer and, in the illustrated embodiment, may include diameter distribution of water service pipe and pump specifications of each well.

The "related data of second decision variables" may be data required to calculate total costs and may include, for example, a material of a water service pipe, a material cost and installment cost for each diameter, a pump flow rate-pumping head characteristic curve, price for each pump, electric charges, and so on.

In this case, the first decision variables of the optimal test combination calculated in first optimization, the numerical analysis control variable, the optimization control variable, and the related data of the second decision variables may be variables preset to a specific value prior to the second optimization S20 and variables included in the second determination variable may be selected in a predetermined numerical range to generate a plurality of test combinations. In addition, via the second optimization S20, an optimal test combination of the plurality of test combinations may be selected.

Figure 7:
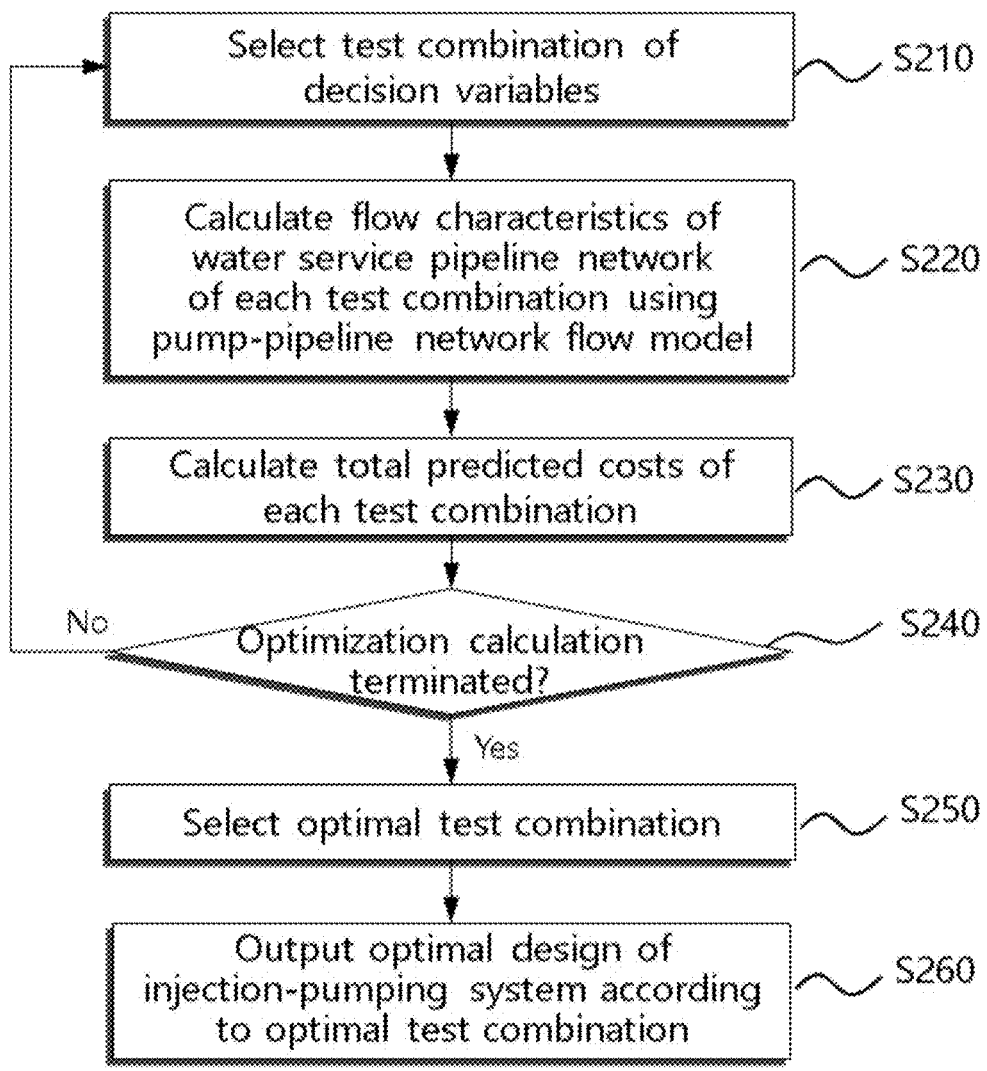
FIG. 7 is a flowchart of an exemplary procedure of second optimization (pump-pipeline network optimization) according to an exemplary embodiment of the present invention.

FIG. 7 is a flowchart of an exemplary procedure of the second optimization (pump-pipeline network optimization) according to an exemplary embodiment of the present invention.

Referring to the drawing, in operation S210, a plurality of test combinations of the second decision variables may be selected. In this case, in order to prevent an excessive increase in the number of test combinations, a range (i.e., a maximum value and a minimum value of each variable) of each of variables included in the second decision variables may be preset and a plurality of test combinations may be generated within the numerical range.

A method of combining variables included in the first decision variables and selecting a test combination may not be particularly limited. In an exemplary embodiment of the present invention, the variables included in the second decision variables may be randomly selected in a predetermined range to generate a test combination. As another example, when operations S220 and S230 are also performed on a predetermined number of test combinations to obtain a plurality of predicted total costs of an aquifer for each test combination, a new test combination may be generated based on the obtained total costs of each test combination.

Then, in operation S220, flow characteristics of a water service pipeline network of each test combination may be calculated using a pump-pipeline network flow model. Many studies and numerical models are disclosed for a pump-pipeline network model and, in the present invention, a pump-pipeline network flow model used in operation S220 is not limited to a specific model and an arbitrary pump-pipeline network flow model may be used.

In this case, the flow characteristics of a water service pipeline network of each test combination calculated in operation S220 may be changed in some embodiments and, for example, may include variables to be used to perform operation S230 of calculating total costs for each test combination as a next operation. In the illustrated embodiment, the flow characteristics of a water service pipeline network may include a value such as energy loss, and flow speed in a water service pipeline network, caused by a pumping head of a pump.

Then, total costs of each test combination may be calculated based on the flow characteristics of a water service pipeline network calculated in operation in S220 (operation S230). In this case, according to an exemplary embodiment of the present invention, total costs of each test combination may be calculated by summing upfront cost of installing a pump and a water service pipeline network of each test combination and management cost of managing the pump and the water service pipeline network.

Operation S220 of calculating the flow characteristics of a water service pipeline network for each test combination and operation S230 of calculating total costs of each test combination may be repeatedly performed on the plurality of test combinations selected in operation S210 and the number of test combinations on which operations S220 and S230 are to be repeatedly performed may be adjusted in operation S240. According to an exemplary embodiment of the present invention, repetition of operation S240 may be stopped when a current repetition number exceeds a preset repetition number or total costs of each test combination calculated in operation S230 is not reduced any longer.

As such, when operation S240 is also performed to calculate total costs of each of a plurality of test combinations, a test combination with minimum total costs among the plurality of test combinations may be selected as an optimal test combination in operation S250.

FIG. 8 is a diagram for explanation of exemplary output data of second optimization according to an exemplary embodiment of the present invention. According to an exemplary embodiment of the present invention, the output data may include a determination variable of an optimal test combination, determination variable related data, and pump-pipeline network flow characteristics of an optimal test combination.

The "determination variable of optimal test combination" may be a second determination variable of a test combination with minimum total costs. The determination variable of the optimal test combination may include second decision variables of the test combination with minimum total costs according to the calculation result of operation S230, that is, data about diameter distribution of water service pipe and pump specifications of each well.

The "decision variable related data" may refer to upfront cost and management cost according to an optimal test combination and may be data obtained during calculation of total costs in operation S230.

The "pump-pipeline network flow characteristics of the optimal test combination" may refer to flow characteristics of the water service pipeline characteristics calculated by applying the optimal test combination to the pump-water service pipeline flow model in operation 220 and include, for example, data such as flow speed and energy loss for each pipe diameter, and pump pumping head.

As indicated in FIG. 8, in an alternative embodiment, test combinations (i.e., the remaining test combinations except for optimal test combination) attempted in an optimization procedure, total costs for each of the test combinations, and so on may be additionally output as the output data of the second optimization S20.

Referring back to FIG. 7, in operation S260, a value of the first decision variables according to the optimal test combination selected in the first optimization S10 and a value of the second determination variable according to the optimal test combination selected in the second optimization S20 may be synthesized to output an optimal design plan of an injection-pumping system.

Figure 9:
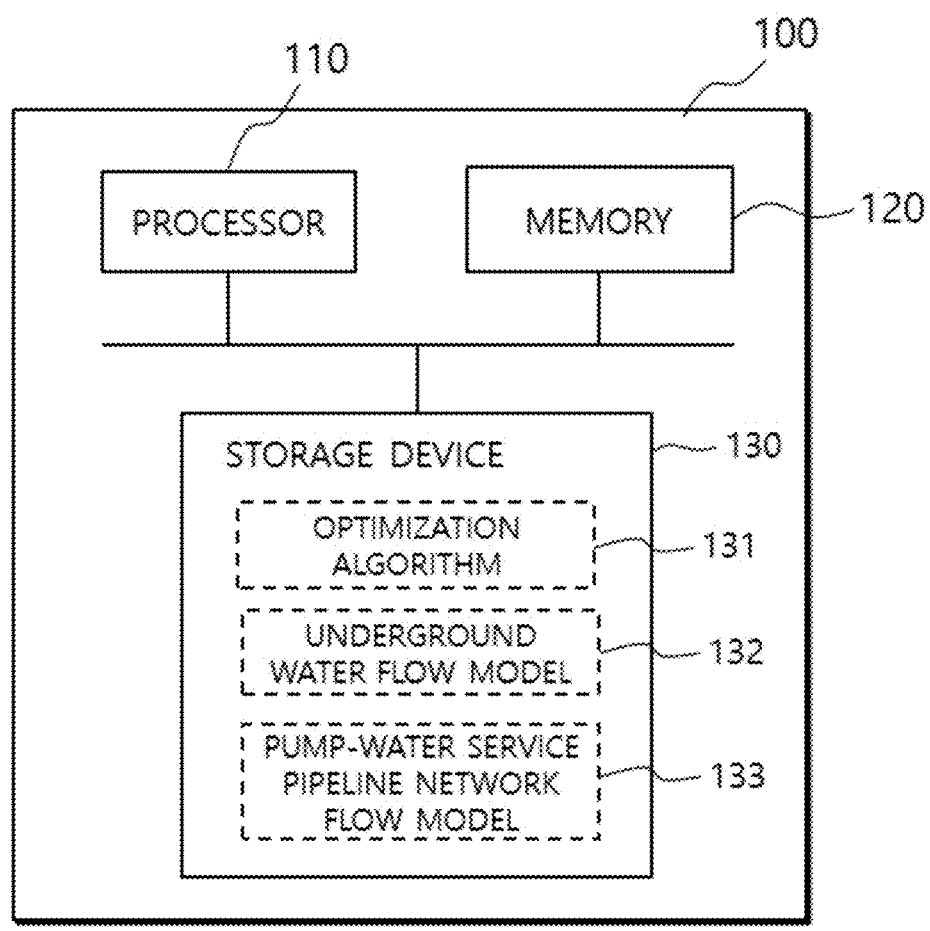
FIG. 9 is a block diagram for explanation of an exemplary structure of a system for optimal design of an aquifer injection-pumping system according to an exemplary embodiment of the present invention.

FIG. 9 is a block diagram for explanation of an exemplary structure of a system 100 for optimal design of an aquifer injection-pumping system according to an exemplary embodiment of the present invention.

Referring to FIG. 9, the system 100 for optimal design of the aquifer injection-pumping system according to an exemplary embodiment of the present invention may be an arbitrary computer device for executing a flowchart to be described with reference to FIGS. 2, 4, and 7 and may include a processor 110, a memory 120, and a storage device 130, as illustrated in the drawing.

The storage device 130 may be a storage medium for semi-permanently storing data, such as a hard disk drive or a flash memory and may store at least one of the aforementioned various algorithms, e.g., an optimization algorithm 131 related to all procedures of FIGS. 2, 4, and 7, an underground water flow model 132 executed in operation S130 of FIG. 4, and a pump-water service pipeline network flow model 133 executed in operation S220 of FIG. 7.

Among these components, these various programs or algorithms may be stored in the storage device 130 and then loaded and executed in the memory 120 under control of the processor 110. Alternatively, some programs or algorithms 131, 132, and 133 may be present in an external device or server separately from the system 100 and, when the system 100 transmits data or a variable to a corresponding external device or a server, the external device or the server may execute the program or the algorithm and then transmit the resultant data to the system 100.

While the invention has been described with reference to certain preferred embodiments thereof and drawings, the present invention is not limited to the above-described embodiments and various changes or modification may be made based on the descriptions provided herein by those skilled in the art. The scope of the present disclosure should not be limited to and defined by the above-described exemplary embodiments, and should be defined not only by the appended claims but also by the equivalents to the scopes of the claims.

What is claimed is:

1. A method for designing an aquifer injection-pumping system using a computer, the method comprising:
    optimizing first decision variables of an injection well and a pumping well based on hydrogeology of an aquifer;
    optimizing second decision variables of a pump and a pipeline network, which are to be installed in the aquifer, based on variable values of the first decision variables obtained in optimizing the first decision variables; and
    designing the aquifer injection-pumping system by applying the optimized first and second decision variables, wherein
    the first decision variables comprise data of the number and locations of injection wells and pumping wells to be installed in the aquifer, and
    the second decision variables comprise data of distribution of a pipe diameter of a water service pipe and pump specification of each of the injection wells and the pumping wells,
    wherein optimizing the second decision variables comprises:
    selecting a plurality of test combinations of the second decision variables;
    calculating flow characteristics of a water service pipeline network of each test combination using a pump-water service pipeline network flow model;
    calculating total costs of each test combination based on the calculated flow characteristics of the water service pipeline network; and
    selecting a test combination with minimum total costs as an optimal test combination among the test combinations.

2. The method of claim 1, wherein optimizing the first decision variables comprises:
    selecting a plurality of test combinations of the first decision variables;
    calculating underground water flow characteristics of each test combination using an underground water flow model;
    calculating performance of the aquifer of each test combination based on the calculated underground water flow characteristics; and
    selecting a test combination with a maximum value of the performance of the aquifer as an optimal test combination among the plurality of test combinations.

3. The method of claim 2, wherein the performance of the aquifer is calculated based on water storage, water quality of a pumping well, and a supply time period of fresh water, which are calculated based on the underground water flow characteristics.

4. The method of claim 2, wherein
    calculating the underground water flow characteristics and calculating the performance of the aquifer are repeatedly performed on each of the plurality of test combinations, and
    the repetitive performing is stopped, if a current repetition number exceeds a preset repetition number or a performance value resulted from calculating the performance of the aquifer is not increased any longer.

5. The method of claim 4, wherein selecting a plurality of the test combinations comprises selecting each test combination by randomly selecting each variable of the first decision variables or selecting each test combination based on a performance value of the aquifer of each test combination.

6. The method of claim 1, wherein the total costs comprises upfront cost required to construct a pump and a water service pipeline network according to each test combination and management cost required to manage the pump and the water service pipeline network.

7. The method of claim 1, wherein:
    calculating the flow characteristics and calculating the total costs are repeatedly performed on each of the plurality of test combinations; and
    the repetitive performing is stopped, if a current repetition number exceeds a preset repetition number or the total costs resulted from calculating the total costs is not reduced any longer.

8. The method of claim 7, wherein selecting a plurality of the test combinations comprises selecting each test combination by randomly selecting each variable of the second decision variables or selecting each test combination based on total costs of each test combination.

9. A computer program product comprising a non-transitory computer readable storage medium having program instructions embodied therewith, the program instructions executable by a processor to cause the processor to perform the method of claim 1.

10. The computer program product according to claim 9, wherein optimizing the first decision variables comprises:
    selecting a plurality of test combinations of the first decision variables;
    calculating underground water flow characteristics of each test combination using an underground water flow model;
    calculating performance of the aquifer of each test combination based on the calculated underground water flow characteristics; and
    selecting a test combination with a maximum value of the performance of the aquifer as an optimal test combination among the plurality of test combinations.

11. The computer program product according to claim 9, wherein the performance of the aquifer is calculated based on water storage, water quality of a pumping well, and a supply time period of fresh water, which are calculated based on the underground water flow characteristics.

12. The computer program product according to claim 9, wherein
    calculating the underground water flow characteristics and calculating the performance of the aquifer are repeatedly performed on each of the plurality of test combinations, and
    the repetitive performing is stopped, if a current repetition number exceeds a preset repetition number or a performance value resulted from calculating the performance of the aquifer is not increased any longer.

13. The computer program product according to claim 9, wherein selecting a plurality of the test combinations comprises selecting each test combination by randomly selecting each variable of the first decision variables or selecting each test combination based on a performance value of the aquifer of each test combination.

14. The computer program product according to claim 9, wherein the total costs comprises upfront cost required to construct a pump and a water service pipeline network according to each test combination and management cost required to manage the pump and the water service pipeline network.

15. The computer program product according to claim 9, wherein:
- calculating the flow characteristics and calculating the total costs are repeatedly performed on each of the plurality of test combinations; and
- the repetitive performing is stopped, if a current repetition number exceeds a preset repetition number or the total costs resulted from calculating the total costs is not reduced any longer.

16. The computer program product according to claim 9, wherein selecting a plurality of the test combinations comprises selecting each test combination by randomly selecting each variable of the second decision variables or selecting each test combination based on total costs of each test combination.

\* \* \* \* \*

UNITED STATES PATENT AND TRADEMARK OFFICE
CERTIFICATE OF CORRECTION

PATENT NO. : 10,515,162 B2  
APPLICATION NO. : 15/517823  
DATED : December 24, 2019  
INVENTOR(S) : Namsik Park and Byunghee Nam Page 1 of 1

It is certified that error appears in the above-identified patent and that said Letters Patent is hereby corrected as shown below:

On the Title Page

Please add to listing of (72) inventor:  
BYUNGHEE NAM - Busan, Republic of Korea Signed and Sealed this  
Twentieth Day of October, 2020

Andrei Iancu  
*Director of the United States Patent and Trademark Office*